United States Patent [19]

Vanderpool et al.

[11] Patent Number: 5,015,458

[45] Date of Patent: May 14, 1991

[54] METHOD FOR PURIFYING SULFURIC ACID SOLUTIONS

[75] Inventors: Clarence D. Vanderpool; Timothy J. Hoffman, both of Towanda, Pa.

[73] Assignee: GTE Products Corporation, Stamford, Conn.

[21] Appl. No.: 504,479

[22] Filed: Apr. 4, 1990

[51] Int. Cl.$^5$ ............................................... C01B 17/90
[52] U.S. Cl. ..................... 423/531; 423/54; 423/138; 423/DIG. 2; 210/668; 210/669; 210/688; 210/694; 210/758; 210/759; 210/912
[58] Field of Search ............... 210/668, 669, 688, 694, 210/758, 759, 912, 722; 423/531, DIG. 2, 138, 54

[56] References Cited

U.S. PATENT DOCUMENTS 3,145,080  8/1964  Jockers et al. ..................... 423/531
4,741,831  5/1988  Grinstead ............................ 210/638

*Primary Examiner*—Peter Hruskoci
*Assistant Examiner*—Krisanne Shideler
*Attorney, Agent, or Firm*—Elizabeth A. Levy

[57] ABSTRACT

A method is disclosed for removing iron from iron-contaminated sulfuric acid to render the sulfuric acid suitable for ion membrane processing which comprises contacting the iron-contaminated sulfuric acid with an oxidizing agent to oxidize essentially all of the iron to the +3 oxidation state, contacting the resulting iron-contaminated sulfuric acid containing oxidized iron with a complexing agent which can be citric acid, oxalic acid, and tartaric acid, with the amount of the complexing agent being sufficient to complex essentially all of the oxidized iron, and contacting the resulting iron-contaminated sulfuric acid containing the complexed iron with activated carbon to remove essentially all of the iron and produce a purified sulfuric acid solution.

2 Claims, No Drawings

METHOD FOR PURIFYING SULFURIC ACID SOLUTIONS

BACKGROUND OF THE INVENTION

This invention relates to a method for purifying sulfuric acid solutions of iron to render the solutions suitable for use in ion membrane processing.

In the manufacture of tungsten a number of by-products are produced which have to be either disposed of or used as an alternate product.

In the processing of tungsten ores, the ore is normally digested in strong base, usually sodium hydroxide, to produce sodium tungstate solution. This solution is purified to remove silicon, phosphorus, arsenic, molybdenun and other impurities. The purified solution is acidified with sulfuric acid to produce a solution of sodium metatungstate and other tungsten species. This solution is feed solution for solvent extraction processing. The tungsten is extracted by an organic extracting agent. The tungsten is stripped from the organic normally by ammonia. The stripped organic is regenerated with sulfuric acid and can then be reused in the solvent extraction process. The solution from which the tungsten is extracted, the raffinate, is a solution of sodium sulfate. This solution can be processed by ion membrane technology to recover sodium hydroxide and sulfuric acid which are usable products. This process avoids production of a waste stream. In ion membrane technology, a cell using ion exchange membranes is used. This cell is a critical part of the process and requires the use of purified solutions since any ion above monovalent contaminates the membranes and renders them inoperative. The sulfuric acid which is used to regenerate the organic becomes contaminated on contact with the organic with small amounts of iron, tungsten, calcium, magnesium and organic. The sulfuric acid concentration in this spent solution is also too low for reuse, about 5% by volume. However, this acid can be added to make up water in the ion membrane process and can therefore be concentrated. Therefore the acid can be reused, thereby avoiding formation of a waste stream. However, in order to be used in the ion membrane process, the sulfuric acid must be purified.

Therefore a process to purify such sulfuric acid solutions would be desirable.

SUMMARY OF THE INVENTION

In accordance with one aspect of the invention, there is provided a method for removing iron from iron-contaminated sulfuric acid to render the sulfuric acid suitable for ion membrane processing which comprises contacting the iron-contaminated sulfuric acid with an oxidizing agent to oxidize essentially all of the iron to the +3 oxidation state, contacting the resulting iron-contaminated sulfuric acid containing oxidized iron with a complexing agent which can be citric acid, oxalic acid, and tartaric acid, with the amount of the complexing agent being sufficient to complex essentially all of the oxidized iron, and contacting the resulting iron-contaminated sulfuric acid containing the complexed iron with activated carbon to remove essentially all of the iron and produce a purified sulfuric acid solution.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The present invention provides a method for purifying sulfuric acid solutions of iron in order that the solutions can be used in ion membrane processing.

The starting solutions are sulfuric acid solutions. The solutions can be of any concentration. However, for the purposes of the present invention the sulfuric acid concentration is usually about 2 to about 10% by volume and most typically about 5% by volume. Normally the solutions are spent sulfuric acid solutions that were used to regenerate organic extracting agents in solvent extraction processing. It is to be understood, however, that any sulfuric acid solution as described above can be used in the practice of the present invention. The solutions are contaminated with iron, usually in amounts of up to about 30 mg Fe/l, and most typically about 20 to about 30 mg Fe/l.

The method of the present invention involves passing the iron-contaminated sulfuric acid through activated carbon after the iron has been oxidized and complexed with an organic acid complexing agent.

For the purposes of the present invention, the sulfuric acid product must be as pure as possible so that it can be used in ion membrane processing. Therefore care must be taken that it is not contaminated during processing. Therefore the activated carbon is preferably the purified form. In addition, to insure purity of the activated carbon, it is normal procedure to first pre-treat the activated carbon to remove any fine particles and any impurities, especially metallic ions contained therein. This is done by first heating the activated carbon and slurrying it in sulfuric acid. The washing can be done by any technique. Normally the activated carbon is slurried in the sulfuric acid wash. This can be followed by washing the activated carbon in a column with more sulfuric acid. The sulfuric acid-washed activated carbon is then washed with water. This is normally done by passing water through the activated carbon in a column.

The iron-contaminated sulfuric acid is first contacted with an oxidizing agent in an amount sufficient to oxidize essentially all of the iron to the +3 oxidation state. The preferred oxidizing agent is hydrogen peroxide. The amount can vary depending on the amount of iron that is present.

The resulting iron-contaminated sulfuric acid containing the oxidized iron is then contacted with a complexing agent to complex essentially all of the oxidized iron. The complexing agents suited to the practice of the present invention are citric acid, oxalic acid, and tartaric acid. These organic acids work becuse they form a large complex molecule under the conditions of the present invention. These molecules are large enough to be removed by the activated carbon from the acid solution. The choice of complexing agent among these depends on economics and availability. The amount of complexing agent depends on the amount of iron present.

The iron-contaminated sulfuric acid containing the complexed iron is then contacted with activated carbon. The resulting sulfuric acid contains less than about 0.5 mg Fe/l which is the limit of detectability of the analytical method used. This represents a removal of essentially all of the starting iron.

To more fully illustrate this invention, the following non-limiting examples are presented.

EXAMPLE 1

About 100 g of activated carbon are heated and slurried in about 1 liter of a 1 to 1 by volume solution of sulfuric acid and water. The activated carbon is then placed in a 500 ml column. The carbon column is then washed with 1 liter of 10% by volume sulfuric acid wash solution and lastly a 4 liter water wash. To about 100 ml of starting iron-contaminated sulfuric acid solution containing about 20 mg Fe/l is added about 1 ml of hydrogen peroxide to oxidize essentially all of the iron to the $+3$ oxidation state. About 1 g of oxalic acid is then dissolved in the solution. The solution is then passed through the activated carbon column. The effluent contains $<0.5$ mg Fe/l.

EXAMPLE 2

To about 100 ml of starting solution containing about 20 mg Fe/l is added about 1 ml of hydrogen peroxide to oxidize essentially all of the iron to the $+3$ oxidation state. About $\frac{1}{2}$ g of oxalic acid is then dissolved in the solution. The solution is then passed through activated carbon. The effluent contains $<.5$ mg Fe/l.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for removing iron from iron-contaminated sulfuric acid to render said sulfuric acid suitable for ion membrane processing, said method comprising:
   (a) contacting said iron-contaminated sulfuric acid with an oxidizing agent to oxidize essentially all of said iron to the $+3$ oxidation state;
   (b) contacting the resulting iron-contaminated sulfuric acid containing oxidized iron with a complexing agent selected from the group consisting of citric acid, oxalic acid, and tartaric acid, with the amount of said complexing agent being sufficient to complex essentially all of said oxidized iron; and
   (c) contacting the resulting iron-contaminated sulfuric acid containing the complexed iron with activated carbon to remove essentially all of the iron and produce a purified sulfuric acid solution.

2. A method of claim 1 wherein said oxidizing agent is hydrogen peroxide.

* * * * *